United States Patent [19]

Rathsack

[11] Patent Number: 5,238,578
[45] Date of Patent: Aug. 24, 1993

[54] UNIVERSAL LIQUID REDUCTION AND TREATMENT SYSTEM AND METHOD

[76] Inventor: Andrew A. Rathsack, 716 Clipper Rd., Springfield, Ill. 62707-9669

[21] Appl. No.: 870,501

[22] Filed: Apr. 17, 1992

Related U.S. Application Data

[62] Division of Ser. No. 616,787, Nov. 21, 1990, Pat. No. 5,135,648.

[51] Int. Cl.$^5$ .............................................. C02F 1/70
[52] U.S. Cl. ........................................ 210/712; 210/702; 210/718; 210/803; 210/804; 210/805; 55/220; 55/222; 55/228
[58] Field of Search ............... 210/702, 712, 718, 803, 210/804, 805, 170, 180, 181, 205, 294, 150, 151, 173; 55/220, 222, 228; 422/198, 225, 228, 231, 234, 261, 279, 288; 405/129; 159/47.1

[56] References Cited

U.S. PATENT DOCUMENTS 5,067,852 11/1991 Plunkett .............................. 405/129

Primary Examiner—Robert A. Dawson
Assistant Examiner—David Reifsnyder
Attorney, Agent, or Firm—Allegretti & Witcoff, Ltd.

[57] ABSTRACT

An apparatus and method for processing an influent liquid including at least a solvent and non-volatile impurities by combining the liquid with a vapor to produce a precipitated sludge is disclosed. The influent liquid is introduced into a wet well. A saturated, water containing reflux and a precipitated sludge are transferred to the well from a reactor. The saturated, water containing reflux precipitated sludge and influent liquid are mixed to form a mixture of saturated, water containing reflux and precipitated sludge. The saturated, water containing reflux is then transferred to the reactor and contacted with a vapor to form the precipitated sludge. The vapor is then discharged from the reactor, and the precipitated sludge is discharged from the wet well.

12 Claims, 2 Drawing Sheets

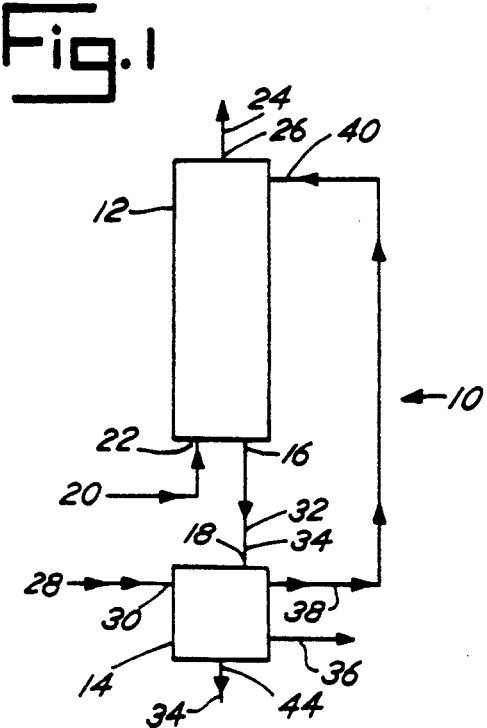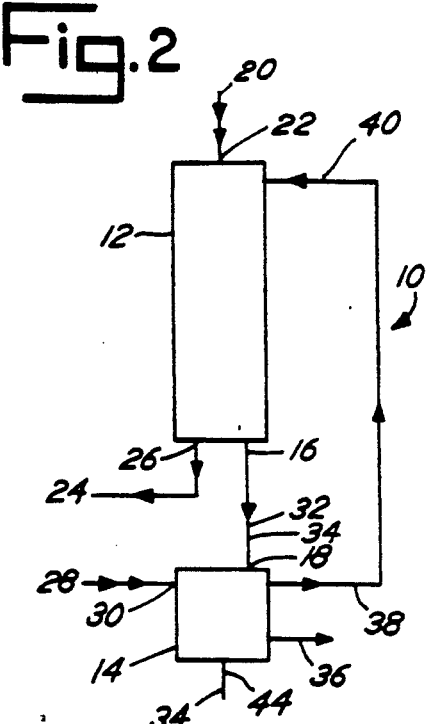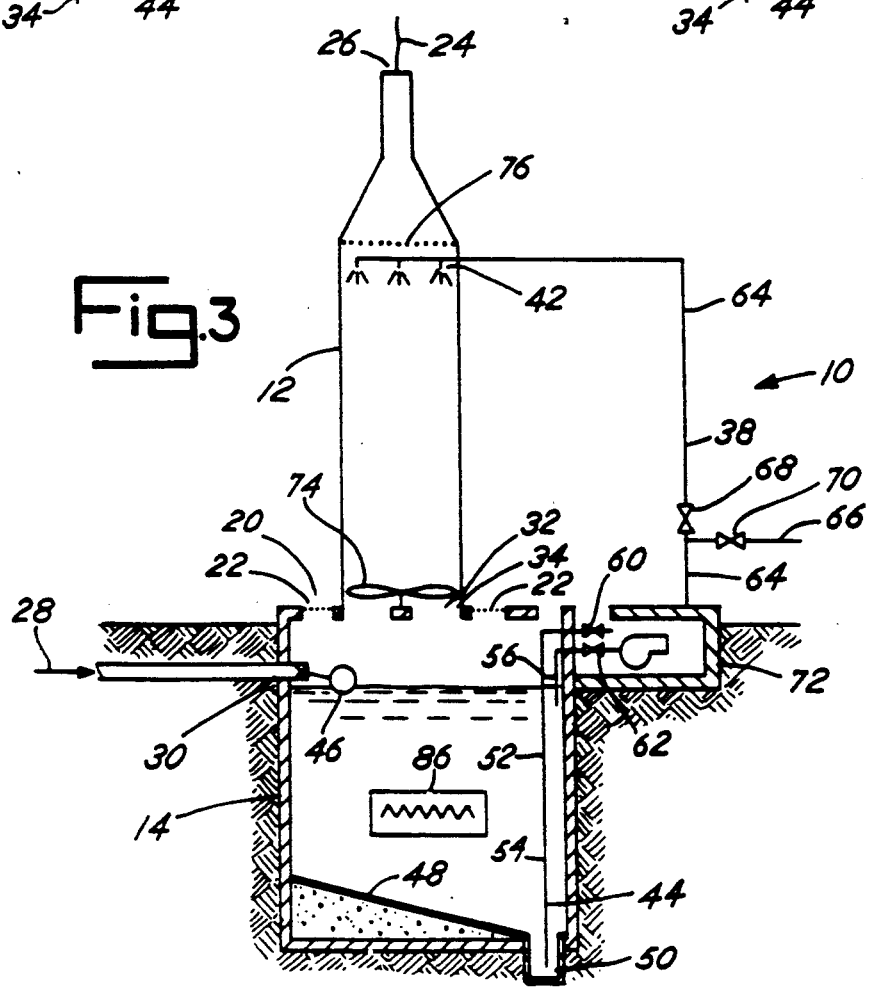

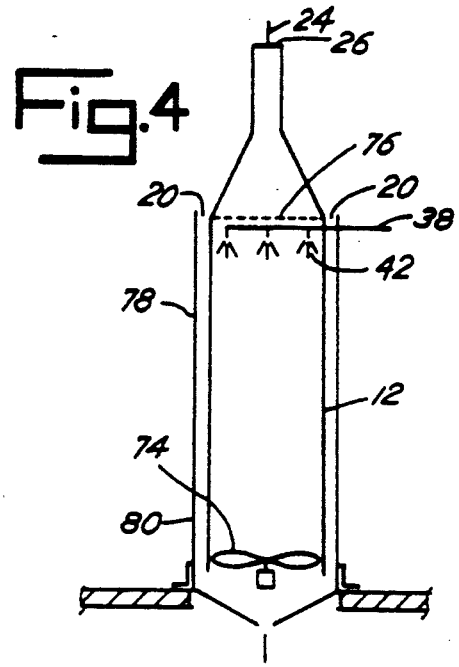
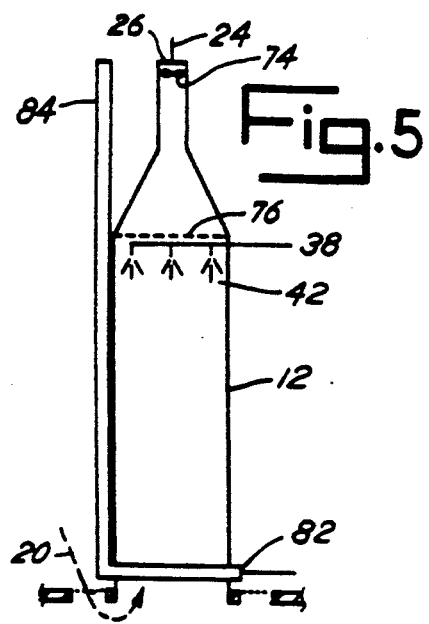
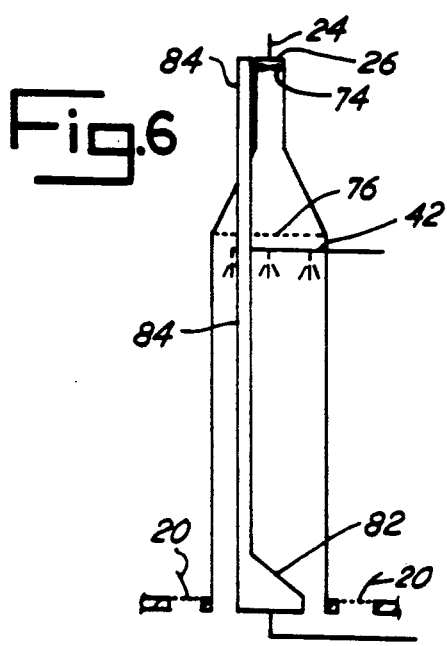
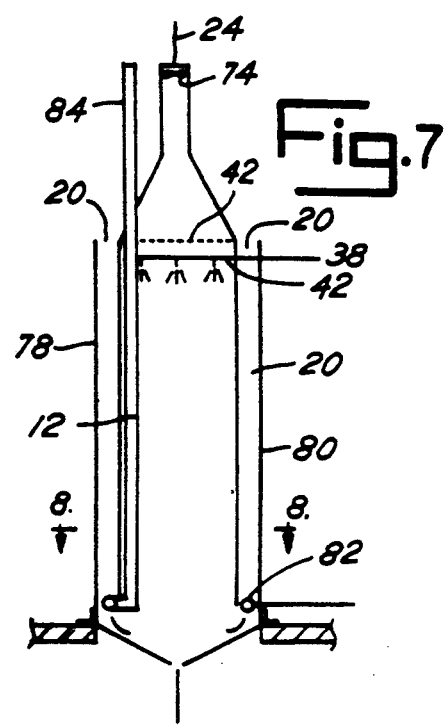
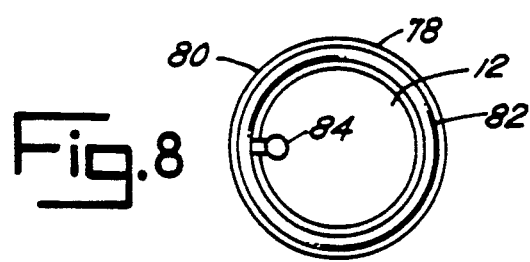

UNIVERSAL LIQUID REDUCTION AND TREATMENT SYSTEM AND METHOD

This is a divisional of application Ser. No. 07/616,787, filed Nov. 21, 1990. Now U.S. Pat. No. 5,135,648.

BACKGROUND OF THE INVENTION

In a principal aspect, the present invention relates to a liquid reduction and treatment apparatus and method for processing an influent liquid including at least a solvent and non-volatile impurities by combining the liquid with a gas or vapor to form a precipitated sludge. Typically, such a liquid is an aqueous solution formed as a byproduct of landfill operations and a gas or vapor is air. The liquid may also contain volatile impurities.

A particular problem associated with solid waste facilities such as landfills is the disposal of liquid wastes resultant from waste contact with infiltrating surface and/or ground waters and the biodegradation of the solid wastes. These liquid wastes are known as leachates, and are typically of high organic strength. Often, they contain a potpourri of dissolved metals and salts. Various volatile organic compounds at various concentrations may also be present in these leachates.

These leachates most often comprise a solvent, such as water, and non-volatile impurities in solution, such as salts. Volatile impurities, either in solution or mixed in the solvent, such as organic liquids, may also be present. In particular, landfill leachates have been said to include water, suspended solids, salts such as ammonium salts, potassium salts, chloride salts, sulfates, and volatile organics, such as alcohols, acids, ketones and aromatics. Landfill leachates often contain microbiological constituents such as bacteria, viruses, fungi and parasites. However, the character of a specific leachate will be dependent upon the character of the wastes in the landfill which generate it. As excellent source of background information regarding landfill leachates is J. Lei, B. Eichenberger, and R. Stearns, *Leachate From Municipal Landfills; Production and Management*, Noyes Publications (1985).

Due to the difficulty and expense to treat leachates, traditionally leachates have been allowed to accumulate within the landfills, thus relying on the dilution and natural attenuative characteristics of the landfill's clay soil liners for treatment as these liquids slowly seep through them.

Because clay liners are relatively impermeable, the leachate levels within landfills can get quite high, which results in increased hydraulic heads and/or exfiltration rates and potentially leachate seeps on exterior sideslopes. In order to reduce the potential for ground and surface water contamination resultant from migration of landfill leachates, there has been ever increasing emphasis placed upon leachate collection and treatment. In fact, the USEPA has proposed and the Illinois EPA has recently adopted rules requiring leachate collection and treatment.

To date, leachate treatment has been very limited and the units used traditionally have been for sewage and other weaker wastewater treatment. Leachate treatment using these traditional processes and treatment techniques is expensive and the resultant treated effluent may still contain excessive total dissolved solids concentrations due to the waste's initial high strength.

In a typical liquid treating apparatus, such as an apparatus for the treatment of polluted liquids or sewage, a multiplicity of vessels are typically employed to separate solids from the liquid to be treated and/or encourage aerobic or anaerobic degradation of the pollutants contained in the liquid to be treated. Complex washing and settling apparatus have been devised, as well. Devices of this type are typically complex and expensive both to build and to operate. Examples of this type of device are disclosed in U.S. Pat. No. 3,811,572, issued to Tatterson on May 21, 1974; U.S. Pat. No. 3,723,309, issued to Garcia on Mar. 27, 1973; U.S. Pat. No. 3,567,629, issued to Ayers et al. on Mar. 2, 1971; and U.S. Pat. No. 3,010,581, issued to Knapp et al. on Nov. 28, 1961.

A problem associated with many of these devices is that filtration processes are slow and exacting. Filtration equipment is expensive and cumbersome because it often must be designed to accommodate a specific precipitate. Filtration also requires continual upkeep of the equipment, such as changing filters, removing filtrate, etc.

Yet another problem associated with liquid treatment devices of this type is that they require a relatively sophisticated design effort specific to the liquid to be treated. Often employing many different stages, these devices are limited in their ability to accommodate different liquids or function under different operating conditions. Moreover, these devices require strict operator control of flowrates, retention times, etc. in order for effective treatment of the liquid to be processed.

Yet another problem associated with liquid treatment devices of this type, particularly sewage or landfill treatment apparatus, is the disposal of leachate and/or landfill gases. These gases, by-products of the decomposition of the sewage or solid wastes, contain methane. Although there is considerable value in the gases due to their potential energy content, the gases are utilized on a very limited basis due to the high costs associated with upgrading their quality and/or transmitting them to a user or a natural gas pipeline.

The present invention constitutes a liquid reduction and treatment apparatus and method for processing an influent liquid that seeks to overcome these problems while at the same time providing a simple, easily constructed design and method that is readily adaptable to a variety of liquids to be processed.

SUMMARY OF THE INVENTION

Briefly, the present invention comprises a liquid reduction and treatment apparatus and method for treating an influent liquid including at least a solvent and nonvolatile impurities by combining the liquid with a gas or vapor to produce a precipitated sludge.

Thus, it is an object of the present invention to provide a liquid reduction and treatment apparatus and method wherein much of the liquid is converted to a sludge residue and a gas or vapor, thereby diminishing and/or eliminating the demand for handling a liquid by-product of the treatment.

A further object of the present invention is to provide a liquid reduction and treatment apparatus and method that does not require a filtration stage.

A further object of the present invention is to provide a liquid reduction and treatment apparatus and method that permits the liquid to be treated to undergo further biodegradation, if desired.

Yet another object of the present invention is to provide a liquid reduction and treatment apparatus and method that is simply designed and inexpensive to manufacture, maintain and/or use.

Still a further object of the present invention is to provide a liquid reduction and treatment apparatus and method that can accommodate a variety of liquids to be treated.

A further object of the present invention is to provide a liquid reduction and treatment apparatus and method that permits the accumulation of sludge residues and their periodic withdrawal.

Yet another object of the present invention is to provide a liquid reduction and treatment apparatus and method that beneficially utilizes combustible gases that form as a by-product of decomposition.

A further object of the present invention is to provide a liquid reduction and treatment apparatus and method that is easily operated on a continuous basis with a minimum of controls and adjustments.

These and other objects, advantages and features of the present invention will be apparent from the detailed description that follows.

BRIEF DESCRIPTION OF THE DRAWING

In the detailed description that follows, reference will be made to the drawing comprised of the following figures:

FIG. 1 is a schematic side view illustrating a preferred embodiment of the apparatus utilizing countercurrent flow;

FIG. 2 is a schematic side view illustrating a preferred embodiment of the apparatus utilizing concurrent flow;

FIG. 3 is a side view schematic illustrating a preferred embodiment of the apparatus;

FIG. 4 is a side cross-sectional view illustrating the reactor of a preferred embodiment of the apparatus having a stripping vapor pre-warmer;

FIG. 5 is a side cross-sectional view illustrating the reactor of a preferred embodiment of the apparatus having a reactor heater;

FIG. 6 is a side cross-sectional view illustrating the reactor of a preferred embodiment of the apparatus having a reactor heater;

FIG. 7 is a side cross-sectional view illustrating the reactor of a preferred embodiment of the apparatus having a reactor heater and a stripping vapor pre-warmer; and FIG. 8 is a top plan cross-sectional view of FIG. 7 as seen along the line 8—8, illustrating the reactor heater of a preferred embodiment of the apparatus.

DETAILED DESCRIPTION OF THE DRAWING

A preferred, specific embodiment of the present invention is a liquid reduction and treatment apparatus 10 having a liquid-vapor phase contactor or reactor 12 and a wet well 14. The wet well 14 can comprise a tank, as illustrated, or can comprise a pond or reservoir out of which sludge, or bottoms, is pumped periodically. The reactor 12 has an exit 16 that is interconnected with an inlet 18 on the wet well 14. A stripping gas or vapor 20 is introduced to the reactor 12 through vapor inlet means 22 for directing the vapor 20 into the reactor 12. It is understood that the terms gas and vapor are used interchangeably, viz., to indicate any matter not in the liquid or solid state. Exhaust means 26 for removing an enriched gas or vapor 24 from the reactor 12 are provided.

A liquid to be processed or influent liquid 28 is introduced into the wet well 14 through an entrance 30 to the wet well 14. A saturated, water containing reflux 32 and a precipitated sludge 34 are introduced into the wet well 14 from the reactor 12 through the inlet 18. In an alternative construction (not shown), the liquid 28 could be introduced directly into the reactor 12.

The influent liquid 28, the saturated, water containing reflux 32 and the precipitated sludge 34 combine to form a mixture of saturated, water containing reflux 32 and precipitated sludge 34. A minor portion of the reflux 32 can be removed from a liquid discharge means 36 should removal be desired. The liquid drainage means 36 is not required in an apparatus in which substantially all of the influent liquid 28 is converted to sludge 34. The major portion of the reflux 32 is removed from the wet well 14 through an outlet 38 and introduced into the upper end of the reactor 12 through an entrance 40 to the reactor 12. The entrance 40 is interconnected to the outlet 38.

Dispersing means 42 for dispersing the feed stream 38 in the reactor 12 is located in the upper end of the reactor 12.

The dispersing means 42 enhances the contact between the saturated, water containing reflux 32 and the stripping vapor 20, increasing the effective surface area and the retention time of the reflux 32 in the reactor 12 so as to increase the mass transfer efficiency of the reactor 12. The dispersing means 42 can comprise packing materials, such as Raschig rings, Berl saddles, etc.

As the reflux 32 is contacted with the stripping vapor 20, volatile impurities, if present, and solvent from the reflux 32 evaporate and are absorbed into the stripping vapor 20, thereby forming the enriched vapor 24. The reflux 32 becomes super-saturated in non-volatile impurities, thereby forming precipitated sludge 34. The sludge 34 and the remaining reflux 32 are then transferred through the reactor exit 16 to the wet well inlet 18. The precipitated sludge 34 is removed from the wet well 14 through the wet well exit 44.

Thus, the precipitated sludge 34 settles and accumulates in the bottom of the wet well 14. It is understood that floating suctions, screens and/or baffles can be used to minimize scum or sludge introduction into the reactor 12. Removing the reflux 32 near the liquid surface also ensures removal of the warmest liquid in the wet well, thereby enhancing the mass transfer operation in the reactor 12.

An embodiment utilizing countercurrent contact between the stripping vapor 20 and the saturated, water containing reflux 32 is illustrated in FIG. 1. Thus, in countercurrent contact, the stripping vapor 20 enters the lower portion of the reactor 12 and is withdrawn from the upper portion of the reactor 12. The stripping vapor 20 moves upward through the reactor 12 and against the downward moving reflux 32.

An embodiment utilizing concurrent (sometimes called "cocurrent") contact between the stripping vapor 20 and the reflux 32 is illustrated in FIG. 2. Thus, in concurrent contact, the stripping vapor 20 enters the upper portion of the reactor 12 and is withdrawn from the lower portion of the reactor 12. The stripping vapor 20 moves downward through the reactor 12 and with the downward moving reflux 32.

As illustrated by FIG. 3, the wet well 14 can be furnished with a liquid level controller 46 located in the wet well entrance 30 to control the liquid level and/or influent liquid flow in the wet well 14. In addition, the wet well 14 is provided with a sloped floor 48 to enable the precipitated sludge 34 to collect in a sludge sump hole 50. Pumping means 52 for pumping the precipitated sludge 34 out of the sludge sump hole 50 are provided.

As shown in FIG. 3, this sludge pumping means 52 includes a sludge conduit 54 extending from the sludge sump hole 50 to a wet well conduit 56 which is connected to a pump 58. A sludge conduit valve 60 located in the sludge conduit 54 permits the sludge conduit 54 to be closed or opened. A wet well valve 62 located in the wet well conduit 56 permits the wet well conduit 56 to be closed or opened.

A feed stream conduit 64 extends from the pump 58 to the upper end of the reactor 12. A sludge outlet conduit 66 is connected to the feed stream conduit 64. A feed stream valve 68 and a sludge outlet valve 70 enable alternate opening and closing of the feed stream conduit 64 and the sludge outlet conduit 66. A pump housing 72 shelters the pump 58.

The sludge pumping means 52 is used as follows. When the precipitated sludge 34 collects in the sludge sump hole 50, the wet well valve 62 and the feed stream valve 68 are closed. The sludge conduit valve 60 and the sludge outlet valve 70 are opened, and the pump 58 is activated, thereby pumping the precipitated sludge 34 out of the wet well 14. To resume pumping of the saturated, water containing reflux 32, the pump 58 is deactivated. The sludge conduit valve 60 and the sludge outlet valve 70 are closed, the wet well valve 62 and the feed stream valve 68 are opened, and the pump 58 is activated.

A blower or fan 74 that pulls the stripping vapor 20 into the lower end of the reactor 12 through the reactor vapor inlet means 22 is shown in FIG. 3. A mist arrestor 76 is located at the upper end of the reactor 12, and captures any liquid droplets of feed stream 38 that become suspended in the stripping vapor 20.

An embodiment of the apparatus having a stripping vapor pre-warmer 78 is illustrated in FIG. 4. The stripping vapor 20 is drawn through a cylindrical annular ring 80 that surrounds the reactor 12. While the stripping vapor is contained in the cylindrical annular ring 80, it absorbs energy from the reactor 12. In addition, during daylight hours, the stripping vapor 20 receives solar energy while it resides within the cylindrical annular ring 80 as the exterior of the cylindrical annular ring 80 is struck by sunlight. To further enhance this absorption of solar energy, the cylindrical annular ring 80 can be painted black.

Embodiments of the apparatus having a reactor heater 82 are shown in FIGS. 5 and 6. Particularly in landfill applications, heat can be generated by burning methane and other naturally produced landfill gases. This is particularly beneficial due to the difficulties in disposing of these gases. Regardless of the fuel source, heating the stripping vapor 20 and/or the reflux 32 hastens the transfer of volatile impurities and solvent from the reflux 32 to the stripping vapor 20.

A reactor heater 82 having an exhaust flue 84 located substantially outside of the reactor 12 is shown in FIG. 5. The reactor heater 82 having an exhaust flue 84 located substantially within the reactor 12 is shown in FIG. 6. Thus, the stripping vapor 20 and the feed stream 38 are further heated. The stripping vapor blower or fan 74 is at the upper end of the reactor 12 near the reactor vapor exhaust means 26, as illustrated by FIGS. 5, 6, and 7.

An embodiment of the apparatus having a stripping vapor pre-warmer 78 and a reactor heater 82 is shown in FIGS. 7 and 8. FIG. 8, a top plan cross-sectional view of FIG. 7 as seen along the line 8—8, illustrates the reactor heater 82 of the reactor 12 being circular and located outside the bottom of the reactor 12. The exhaust flue 84 extends through the reactor 12. The stripping vapor 20 is drawn through the prewarmer 78 as illustrated in FIG. 4, and is then heated by the reactor heater 82 before entering the reactor 12.

A wet well heater 86 that heats the feed stream 38 is shown in FIG. 3. By heating the reflux 32, the transfer of volatile impurities, if present, and solvent in the reflux 32 to the stripping vapor 20 is enhanced.

The optimal relative flowrate of reflux 32 to vapor 20, or, alternatively, the reflux ration, necessary to maximize the mass transfer rate, can be calculated by standard engineering calculations, and is a function of the inherent mass transfer efficiency and heat transfer characteristics of the reactor 12, ambient temperature, internal pressure, relative humidity, etc. Because heating the reflux 32 increases the vapor pressure of water and any volatiles that may be contained therein, heating increases the mass transfer rate for the reactor 12.

A typical reactor 12 has an internal volume of between twenty (20) and four thousand (4,000) cubic feet ($ft.^3$). The flowrate of reflux 32 into the reactor 12 is typically between three (3) and ten (10) gallons per minute, and is varied according to the ambient and operating temperatures and relative humidity. A more preferred flowrate is between four (4) and seven (7) gallons per minute.

The reactor 12 is typically operated at atmospheric pressure, although use of a partial vacuum is contemplated. The vacuum could be as great as approximately minus five ($-5$) p.s.i.g. (pounds per square inch gauge), or 9.7 p.s.i.a. (pounds per square inch absolute).

The operating temperature of the reactor 12 can vary from ambient temperature to as high as 100° C., with a preferred range between 5° C. and 90° C. Optimally, the reactor temperature is maintained between 10° C. and 37° C. if ongoing biodegradation is desired, since utilizing too high a temperature would kill microorganisms. However, if biodegradation is not desired, the higher the temperature, the more mass transfer will be effected. It is understood, then, that the optimal temperature is a function of the desired level of biological activity, and source and availability of fuel for supplemental heating.

The foregoing detailed description describes the preferred embodiments of the invention. As described, these preferred embodiments operate at steady state. It is clear, however, that unsteady state operation could be effected, and that, therefore, the definition of terms such as "saturated" and "super-saturated" may include unsaturated streams during periods of unsteady state operation. Further, the preferred embodiments may be variously modified. Therefore, to particularly point out and distinctly claim the subject matter regarded as invention, the following claims conclude this specification.

What is claimed is:

1. A method for reducing and treating an influent liquid including at least a solvent and non-volatile impurities, the method comprising introducing the influent liquid into a wet well; transferring a saturated, water containing reflux and a precipitated sludge from a reactor to the wet well; combining the influent liquid with the saturated, water containing reflux and the precipitated sludge in the well to form a mixture of saturated, water containing reflux and precipitated sludge; transferring the saturated, water containing reflux from the wet well to the reactor; introducing a vapor into the reactor; dispersing the saturated, water containing reflux in the reactor and contacting it with the vapor to transfer water vapor and volatile impurities to the vapor, thereby forming the precipitated sludge and the saturated, water containing reflux; discharging the vapor from the reactor; and discharging the precipitated sludge from the wet well.

2. The method according to claim 1 further comprising countercurrently contacting the saturated, water containing sludge with the vapor.

3. The method according to claim 1 further comprising concurrently contacting the saturated, water containing sludge with the vapor.

4. The method according to claim 1 further comprising heating the saturated, water containing sludge and the stripping vapor.

5. The method according to claim 1 further comprising heating the saturated, water containing reflux and the precipitated sludge.

6. A method for reducing and treating an influent liquid including at least a solvent and non-volatile impurities, the method comprising introducing the influent liquid into a wet well; transferring a saturated, water containing reflux and a precipitated sludge from a reactor to the wet well; combining the influent liquid with the saturated, water containing reflux and the precipitated sludge to form a mixture of saturated, water containing reflux and precipitated sludge; heating the saturated, water containing reflux; transferring the saturated water containing reflux from the wet well to the reactor; dispersing the saturated, water containing reflux in the reactor; countercurrently contacting the saturated, water containing reflux with a vapor, thereby transferring water vapor from the saturated, water containing reflux to the vapor and forming the precipitated sludge; arresting entrained mist in the enriched vapor; discharging the enriched vapor from the reactor; and discharging the precipitated sludge from the wet well.

7. A method for reducing and treating an influent liquid including at least a solvent and non-volatile impurities, the method comprising introducing the influent liquid into a reactor; transferring a saturated, water containing reflux and a precipitated sludge from the reactor to a wet well; combining the saturated, water containing reflux and the precipitated sludge in the well to form a mixture of saturated, water containing reflux and precipitated sludge; transferring the saturated, water containing reflux from the wet well to the reactor; introducing a vapor into the reactor; dispersing the saturated, water containing reflux and the influent liquid in the reactor and contacting them with the vapor to transfer water vapor and volatile impurities to the vapor, thereby forming the precipitated sludge and the saturated, water containing reflux; discharging the vapor from the reactor; and discharging the precipitated sludge from the wet well.

8. The method according to claim 7 further comprising countercurrently contacting the saturated, water containing sludge with the vapor.

9. The method according to claim 7 further comprising concurrently contacting the saturated, water containing sludge with the vapor.

10. The method according to claim 7 further comprising heating the saturated, water containing sludge and the stripping vapor.

11. The method according to claim 7 further comprising heating the saturated, water containing reflux and the precipitated sludge.

12. A method for reducing and treating an influent liquid including at least a solvent and non-volatile impurities, the method comprising introducing the influent liquid into a reactor; transferring a saturated, water containing reflux and a precipitated sludge from the reactor to a wet well; combining the saturated, water containing reflux and the precipitated sludge to form a mixture of saturated, water containing reflux and precipitated sludge; heating the saturated, water containing reflux; transferring the saturated water containing reflux from the wet well to the reactor; dispersing the saturated, water containing reflux and the influent liquid in the reactor; countercurrently contacting the saturated, water containing reflux and the influent liquid with a vapor, thereby transferring water vapor from the saturated, water containing reflux and the influent liquid to the vapor and forming the precipitated sludge; arresting entrained mist in the enriched vapor; discharging the enriched vapor from the reactor; and discharging the precipitated sludge from the wet well.

* * * * *